United States Patent
Goth et al.

(10) Patent No.: US 9,606,562 B2
(45) Date of Patent: *Mar. 28, 2017

(54) THERMAL MANAGEMENT IN A MULTI-PHASE POWER SYSTEM

(71) Applicant: International Business Machines Corporation, Armonk, NY (US)

(72) Inventors: Gary F. Goth, Pleasant Valley, NY (US); Robert P. Makowicki, Staatsbury, NY (US); Steven G. Shevach, Hurly, NY (US); Allan C. VanDeventer, Poughkeepsie, NY (US); Xiaojin Wei, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,976

(22) Filed: Aug. 21, 2015

(65) Prior Publication Data

US 2016/0139619 A1    May 19, 2016

Related U.S. Application Data

(63) Continuation of application No. 14/543,970, filed on Nov. 18, 2014.

(51) Int. Cl.
*H02M 3/02* (2006.01)
*G05F 3/02* (2006.01)
(Continued)

(52) U.S. Cl.
CPC ............... *G05F 3/02* (2013.01); *H02M 1/32* (2013.01); *H02M 3/156* (2013.01); *H02M 3/285* (2013.01);
(Continued)

(58) Field of Classification Search
CPC . G05F 3/02; G05F 3/222; G05F 3/225; G05F 3/242; G05F 1/462; H02M 1/32;
(Continued)

(56) References Cited

U.S. PATENT DOCUMENTS 7,467,309 B2 * 12/2008 Templeton .............. H02J 1/102
                                                    713/300
7,895,455 B2 *  2/2011 Green ....................... G06F 1/26
                                                     307/52

(Continued)

OTHER PUBLICATIONS

List of IBM Patents or Patent Applications Treated as Related, Aug. 21, 2015, 2 pages.

(Continued)

*Primary Examiner* — Timothy J Dole
*Assistant Examiner* — Shahzeb K Ahmad
(74) *Attorney, Agent, or Firm* — Cantor Colburn LLP; Margaret A. McNamara

(57) ABSTRACT

One aspect is a method that includes applying a plurality of incrementally varying voltage targets to a plurality of power phase converters operating in parallel between a source voltage rail and a load voltage rail. A phase temperature of each of the power phase converters is monitored. The phase temperature of each of the power phase converters is compared to a thermal adjustment limit. One or more of the power phase converters are adjusted to reduce an associated output current based on determining that at least one of the power phase converters exceeds the thermal adjustment limit. Power phase converter adjustments can be performed in a balanced manner such that a net sum voltage at the load voltage rail is substantially unchanged after the adjustments.

6 Claims, 10 Drawing Sheets

(51) Int. Cl.
  *H02M 1/32*  (2007.01)
  *H02M 3/156*  (2006.01)
  *H02M 3/28*  (2006.01)
  *H02J 1/10*  (2006.01)

(52) U.S. Cl.
  CPC ........ *H02J 1/102* (2013.01); *H02M 2001/327* (2013.01)

(58) Field of Classification Search
  CPC ........... H02M 2001/327; H02M 3/156; H02M 3/285; H02M 3/158; H02J 1/102
  See application file for complete search history.

(56) References Cited

U.S. PATENT DOCUMENTS

| | | | |
|---|---|---|---|
| 2014/0203646 A1* | 7/2014 | Belur ........................ | H02J 3/26 307/52 |
| 2014/0285964 A1* | 9/2014 | Atkinson ................ | G06F 1/203 361/679.46 |
| 2015/0207400 A1* | 7/2015 | Shenoy ............... | H02M 3/1584 323/213 |

OTHER PUBLICATIONS

U.S. Appl. No. 14/543,970, filed Nov. 18, 2014, Entitled: "Thermal Management in a Multi-phase Power System," First Named Inventor: Gary F. Goth.

* cited by examiner

THERMAL MANAGEMENT IN A MULTI-PHASE POWER SYSTEM

DOMESTIC PRIORITY

This application is a continuation of U.S. patent application Ser. No. 14/543,970 filed Nov. 18, 2014, the content of which is incorporated by reference herein in its entirety.

BACKGROUND

The present application relates generally to thermal management in a power supply. More specifically, the present application is directed to thermal management in a multi-phase power system of a computer system.

In a large-scale computer system, such as a server, a number of electronics cards can be installed in close proximity to each other. For example, a computer system chassis can include racks of cards for processors, memory, communication, input/output interfaces, power management, and the like. When powered, the computer system generates a substantial amount of heat. Cooling features such as heat sinks and cooling fans are typically used to dissipate heat and prevent potentially degraded performance associated with an overheating condition. Locally within a computer system hot-spots can exist where higher current paths are located in close physical proximity and/or effectiveness of cooling flow is reduced. A cooling flow produced by cooling fans can be sufficient under a number of operating scenarios; however, if one of the cooling fans fails, the reduced cooling flow may lead to reduced heat dissipation. Cooling flow effectiveness can also be reduced based on a cooling flow path that draws air over a series of hot spots. A sustained high computational load or operation near peak conditions may result in increased current draw that can lead to increased heat production. Changes in ambient environmental temperature can also alter cooling flow effectiveness.

A server typically has a number of voltage levels that can have varying electric current requirements depending upon loads. Point-of-load (POL) cards can be used to supply current to individual voltage levels, such as feeding multiple voltage levels to one or more processors. Multiple power stage chips (or power phase converters) may be arranged in a serial manner relative to airflow. For instance, a POL card for a processor chip may have three power phase converters near an air inlet to provide a first voltage level to a first load voltage rail followed from an airflow perspective by eleven power phase converters in series to provide a second voltage level to a second load voltage rail, where all fourteen power phase converters are thermally linked to a common heat sink. Similarly, memory chips or memory control chip power levels may also be delivered via a number of power phases that are thermally linked in series regarding airflow for cooling in another POL card.

Power system hardware typically balances electrical current per power phase converter by targeting the same voltage level per rail. This generates similar heat loads in each power phase converter, resulting in cooler power phase converters near the air inlet and warmer power phase converters being cooled by the hotter preheated downstream airflow. The warmest power phase converter typically dictates the power supportable by the POL card. Once one power phase converter's thermal limit is exceeded, it turns off with its current being shed on the smaller number of power phase converters that remain enabled, which may result in a cascading shutdown as higher current and heat are realized in the remaining enabled power phase converters. Thus, a thermal failure on one power phase converter can effectively change an electrically dual-redundant phase design into non-redundant thermal design, if the failure of one power phase converter results in a shutdown of the POL card and server.

SUMMARY

Embodiments relate to thermal management in a multi-phase power system. One aspect is a method that includes applying a plurality of incrementally varying voltage targets to a plurality of power phase converters operating in parallel between a source voltage rail and a load voltage rail. A phase temperature of each of the power phase converters is monitored. The phase temperature of each of the power phase converters is compared to a thermal adjustment limit. One or more of the power phase converters are adjusted to reduce an associated output current based on determining that at least one of the power phase converters exceeds the thermal adjustment limit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems, methods and computer program products for thermal management in a multi-phase power system in a computer system. Rather than seeking to balance phase currents from a power supply source voltage rail to a load voltage rail, embodiments unbalance electric current outputs of each power phase converter based on an average coolability of a power phase converter position on a point-of-load (POL) card. Firmware can be executed locally by a controller on the POL card to alter an output voltage slightly based on the power phase converter position. As a server that includes the POL card is operating, each power phase converter can re-target its output voltage further based on an actual operating temperature of the respective power phase converter. In this manner all power phase converters are kept at close to the same temperature, improving reliability and potentially increasing current delivered for a given POL card prior to reaching a thermal shutdown condition. Embodiments may also protect against variability due to a poor or degraded thermal margin on one or two power phase converters or higher heat generation than typical in a given power phase converter. After a maximum level of available power is extracted from the POL card, a throttle may be implemented to protect the server from a shutdown condition by reducing one or more processor clocks and/or shedding of loads.

Figure 1:
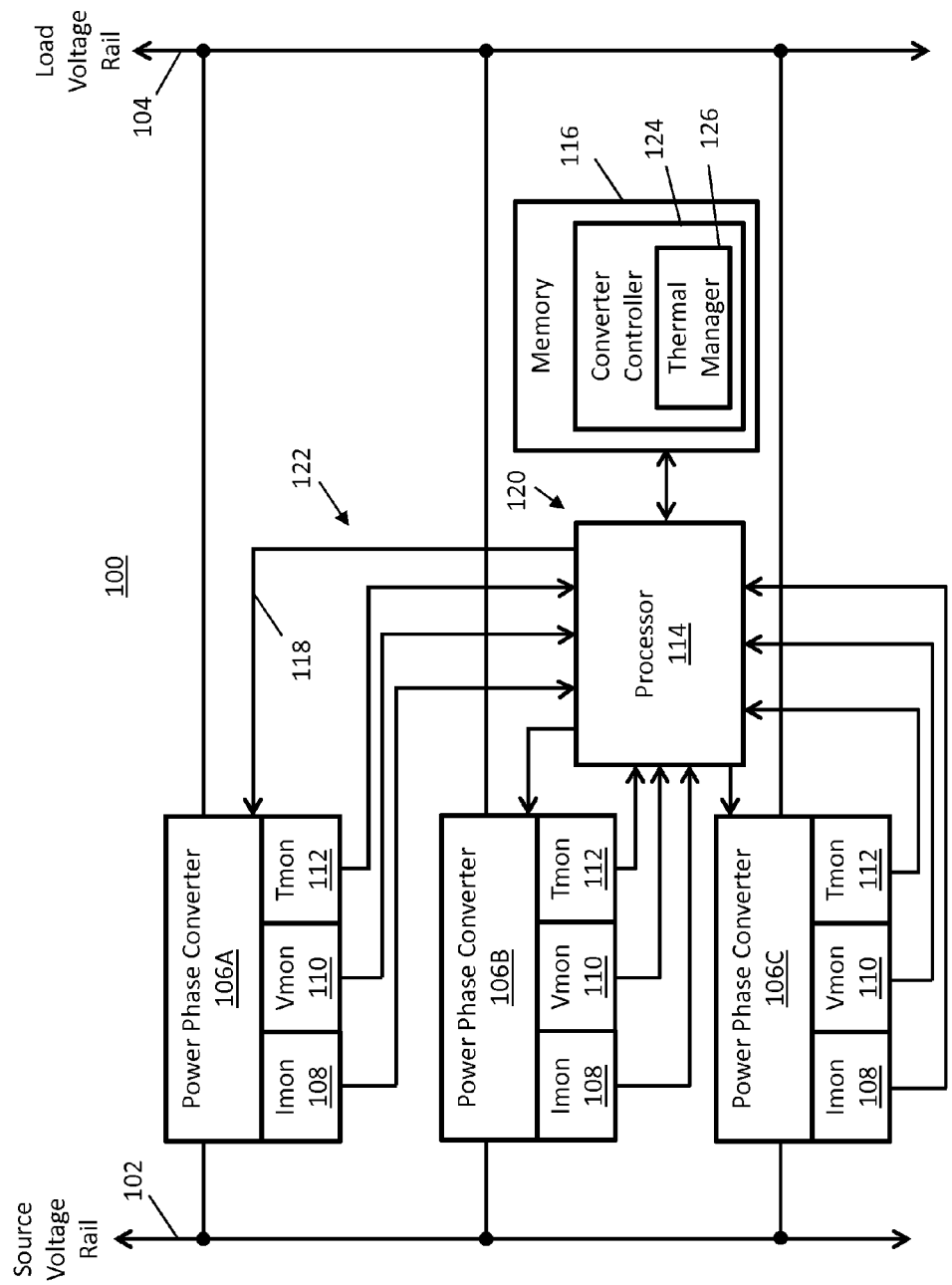
FIG. 1 is an exemplary diagram of a portion of a system in which aspects of the exemplary embodiments may be implemented.

Turning now to FIG. 1, a portion of a system 100 is generally shown that regulates power flow between a source voltage rail 102 and a load voltage rail 104 using a plurality of power phase converters 106 operating in parallel, depicted as power phase converters 106A, 106B, and 106C. Each of the power phase converters 106 may include a current monitor 108, a voltage monitor 110, and a temperature monitor 112. The current monitor 108 can indicate an associated input and/or output current for each of the power phase converters 106. The voltage monitor 110 may indicate an associated input and/or output voltage for each of the power phase converters 106. The temperature monitor 112 may indicate a phase temperature of each of the power phase converters 106. A controller 120 interfaces with the current monitor 108, the voltage monitor 110, and the temperature monitor 112 of each of the power phase converters 106. The controller 120 can set and adjust a voltage target 118 for each of the power phase converters 106 as separate set points to alter the current flowing through each of the power phase converters 106. Control and sensor signals of FIG. 1 are collectively referred to as a power phase bus 122 between the controller 120 and each of the power phase converters 106.

The controller 120 includes a processor 114 and memory system 116. The processor 114 can be any type of processing circuitry or microcontroller, including multiple instances thereof, that is configurable to execute processes further described herein, where the memory system 116 is an example of a tangible storage medium. The memory system 116 can include a converter controller 124 with a thermal manager 126. The converter controller 124 and thermal manager 126 may be partitioned as one or more computer program products. In an exemplary embodiment, the processor 114 is coupled to the memory system 116, and the processor 114 is configured to execute the converter controller 124 and thermal manager 126. The processor 114 may be any type of processor (CPU), including a general purpose processor, a digital signal processor, a microcontroller, an application specific integrated circuit, a field programmable gate array, or the like. The memory system 116 may include random access memory (RAM), read only memory (ROM), or other electronic, optical, magnetic, or any other computer readable medium onto which is stored the converter controller 124 and thermal manager 126.

The converter controller 124 can control an associated current output from each power phase converter 106 to the load voltage rail 104 based on the voltage target 118 set for each of the power phase converters 106. By applying incrementally varying voltage targets 118 to the power phase converters 106, an unbalanced current output is produced across the power phase converters 106. The thermal manager 126 may use each of the temperature monitors 112 to monitor a phase temperature of each of the power phase converters 106 and compare the phase temperature of each of the power phase converters 106 to a thermal adjustment limit. To achieve a substantially balanced temperature across all of the power phase converters 106A-106C, the thermal manager 126 can adjust the voltage targets 118 sent to one or more of the power phase converters 106 to reduce an associated output current based on determining that at least one of the power phase converters 106 exceeds the thermal adjustment limit.

Figure 2:
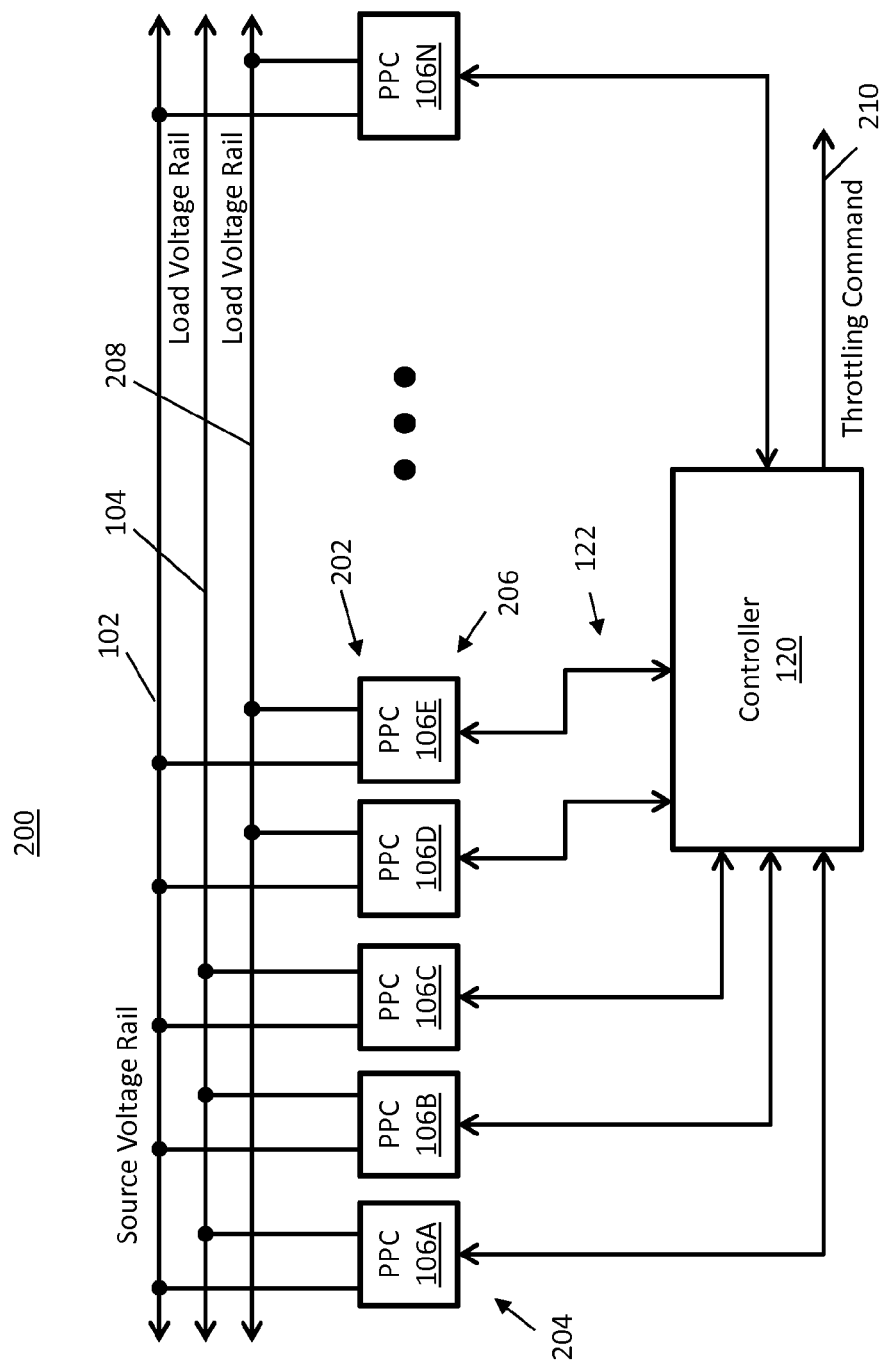
FIG. 2 is an exemplary block diagram of a portion of a system in accordance with an embodiment.

FIG. 2 is an exemplary block diagram of a portion of a system 200 in accordance with an embodiment, for instance, as part of a POL card. As depicted in the example of FIG. 2, a series 202 of the power phase converters 106 of FIG. 1 includes a plurality of subgroups 204, 206. A first subgroup 204 of the power phase converters 106 include power phase converters 106A, 106B, and 106C. A second subgroup 206 includes power phase converters 106D and 106E-106N. The first subgroup 204 of the power phase converters 106 is coupled to the source voltage rail 102 and the load voltage rail 104. The second subgroup 206 of the power phase converters 106 is coupled to the source voltage rail 102 and a second load voltage rail 208. The voltage and current demands of the load voltage rail 104 and the second load voltage rail 208 may vary substantially relative to each other. For example, the second load voltage rail 208 may have over 30% greater voltage and over twenty times greater current than load voltage rail 104. Thus, adjustments to the power phase converters 106 can be performed at a subgroup level to substantially balance the phase temperature across each of the first and second subgroups 204, 206. As in the example of FIG. 1, the power phase bus 122 between the controller 120 and each of the power phase converters 106 enables active control and monitoring of the power phase converters 106. The controller 120 may also output a throttling command 210 to request a load reduction when direct thermal management performed by the controller 120 is insufficient to prevent a potential thermal shutdown condition.

Figure 3:
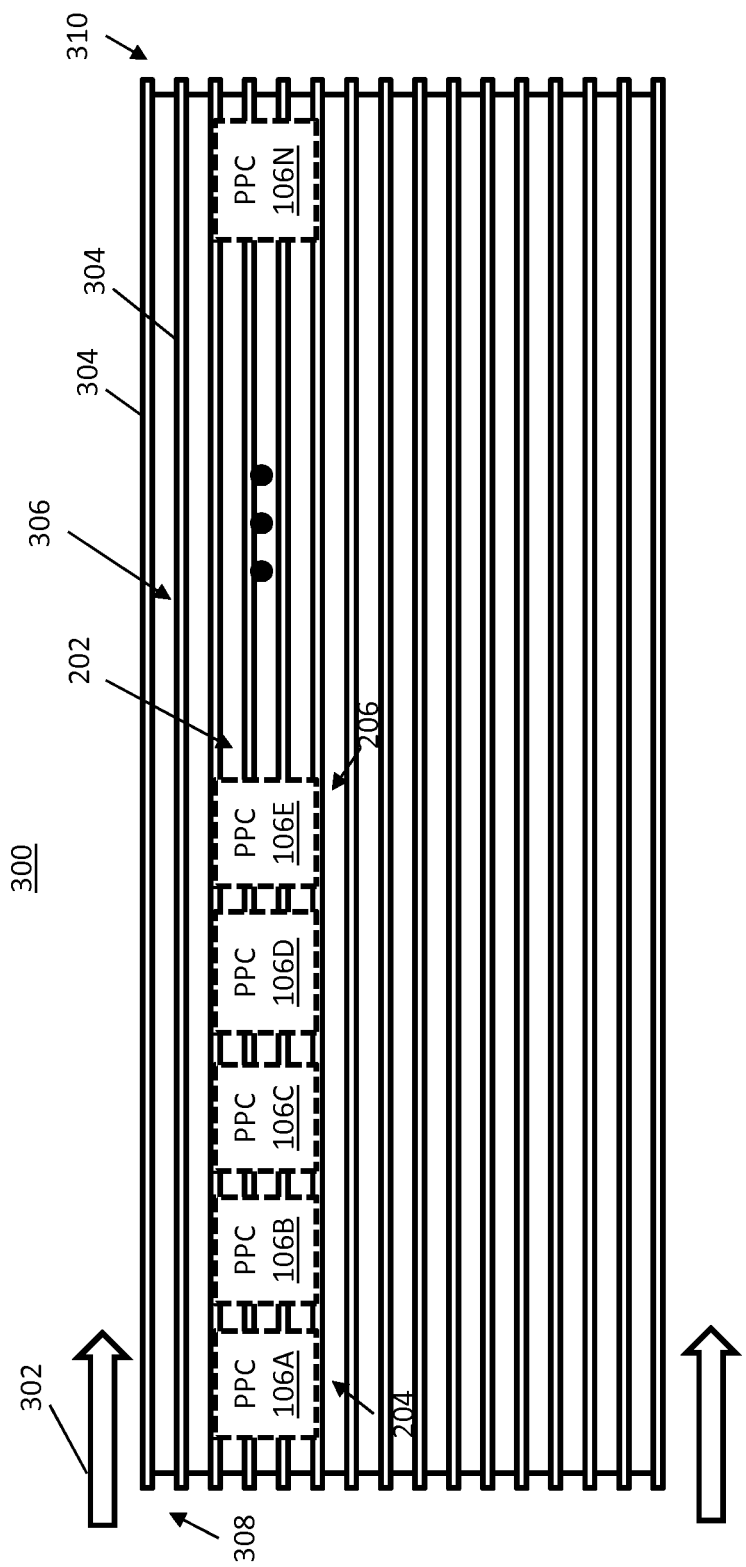
FIG. 3 illustrates a cooling flow across a heat sink associated with a series of power phase converters in accordance with an exemplary embodiment.

FIG. 3 illustrates a cooling flow 302 across a heat sink 300 associated with the series 202 of power phase converters 106 in accordance with an exemplary embodiment. In the example of FIG. 3, the first and second subgroups 204, 206 of power phase converters 106 in the series 202 share the heat sink 300 to dissipate heat. The heat sink 300 includes a plurality of fins 304 with channels 306 formed between pairs of fins 304. As the cooling flow 302 passes from an air inlet side 308 to an air outlet side 310 and over the series 202 of power phase converters 106, the effective cooling of the cooling flow 302 is reduced. Heat dissipated from the power phase converters 106 to the cooling flow 302 results in a temperature increase of the cooling flow 302 between the air inlet side 308 to an air outlet side 310. Thus, if electric current balancing is performed for the first subgroup 204 and the second subgroup 206, a temperature imbalance can result in power phase converters 106 successively in the series 202.

Figure 4:
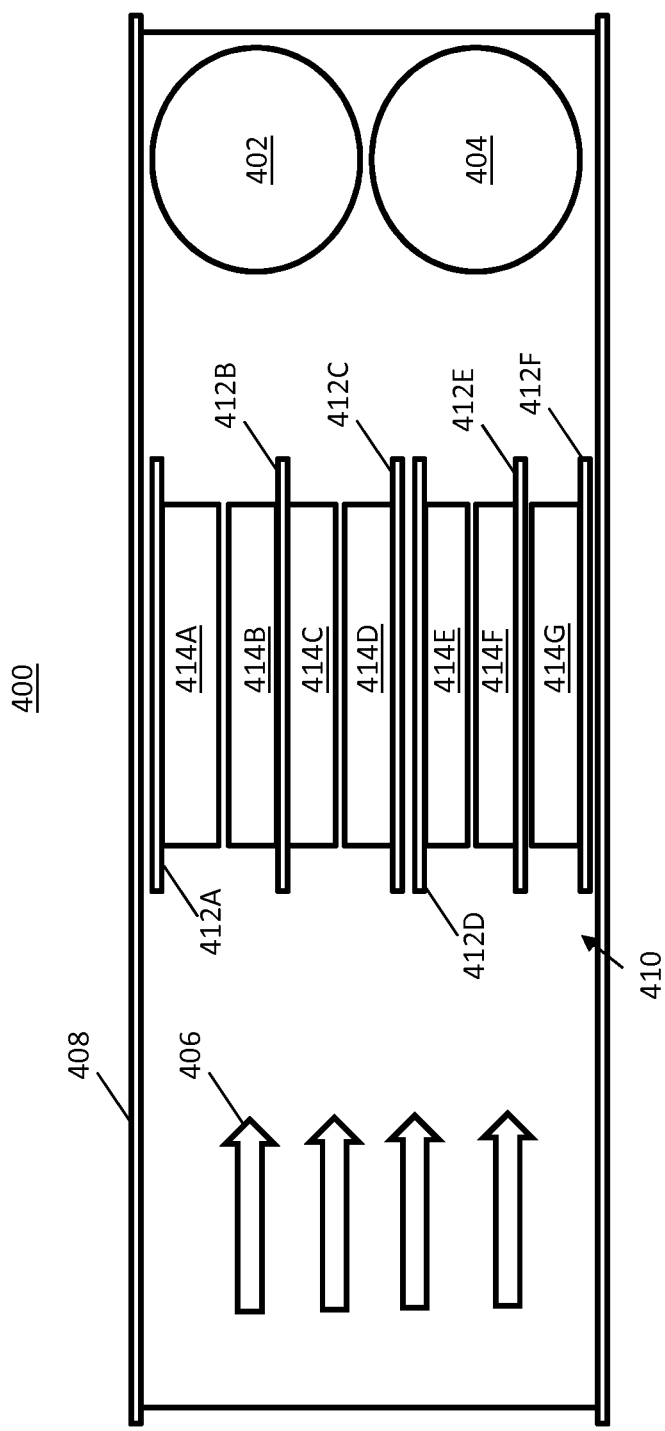
FIG. 4 is an exemplary block diagram of a portion of a server in accordance with an exemplary embodiment.

FIG. 4 is an exemplary block diagram of a portion of a server 400 in accordance with an exemplary embodiment. In the example of FIG. 4, a first circulation fan 402 and a second circulation fan 404 draw a cooling flow 406 through a chassis 408 of the server 400. A rack arrangement 410 within the chassis 408 includes a plurality of POL cards 412 and loads 414 that receive electric power from the POL cards 412. Each of the POL cards 412 can include an instance of the system 200 of FIG. 2 and the heat sink 300 of FIG. 3. The loads 414 can be server processor cards, memory system cards, input/output cards, networking and communication cards, and the like. Each of the POL cards 412 can provide voltage load rails to one or more of the loads 414. As depicted in the example of FIG. 4, POL card 412A provides power to load 414A, POL card 412B provides power to loads 414C and 414D, POL card 412C provides power to 414D, POL card 412D provides power to load 414E, POL card 412E provides power to load 414F, and POL card 412F provides power to load 414G. Although the POL cards 412 and loads 414 are depicted in close physical proximity in FIG. 4, they can be partitioned in other configurations, such as placing one or more of the loads in a separate rack or racks (not depicted) within the chassis 408.

Nominal temperatures at each of the POL cards 412 can vary depending upon the current demands of associated loads 414 and location within the rack arrangement 410 relative to the cooling flow 406. For example, POL cards 412 that power server processor cards may, in general, run hotter due to a higher current demand than input/output loads. Similarly, POL cards 412 that are centrally located, such as POL cards 412C and 412D may run hotter than POL cards 412B and 412E due to a centralized buildup of heat. POL cards 412A and 412F may run hotter than POL cards 412C and 412D due to reduced exposure to the cooling flow 406 closer to the chassis 408. If either the first circulation fan 402 or the second circulation fan 404 should fail, additional temperature increases can occur as effectiveness of the cooling flow 406 is reduced. Thus, a fixed set point for a voltage target and/or current target may not be sufficiently robust to account for differences in location of the POL cards 412 and effectiveness of the cooling flow 406.

Figure 5:
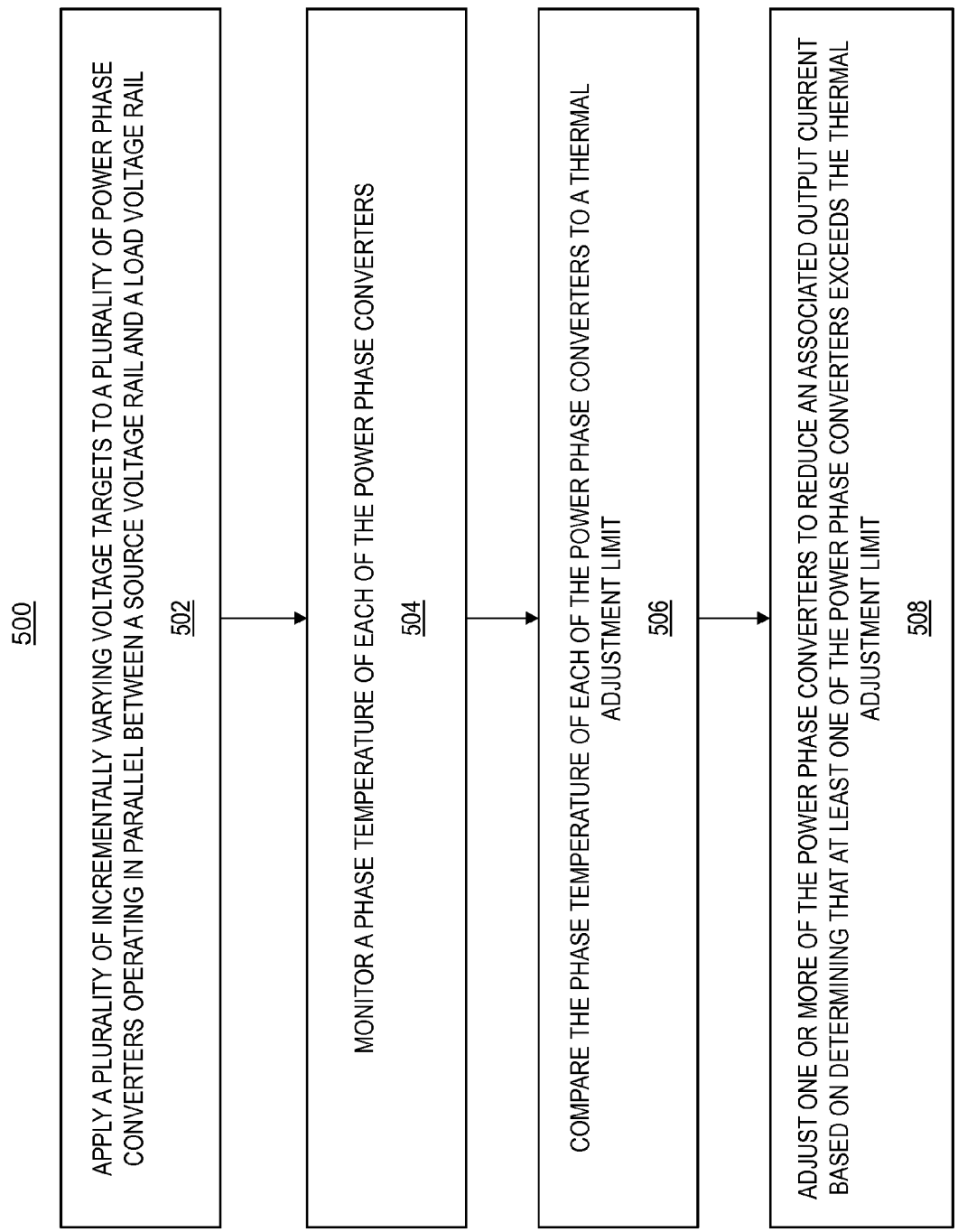
FIG. 5 illustrates a flow diagram of a method for thermal management in a multi-phase power system in accordance with an exemplary embodiment.

FIG. 5 illustrates a flow diagram of a method 500 for thermal management in a multi-phase power system in accordance with an exemplary embodiment. The method 500 can be performed by the controller 120 of FIGS. 1 and 2 and is further described in reference to FIGS. 1-4 for purposes of explanation. However, the method 500 of FIG. 5 can be implemented on systems with alternate configurations and elements beyond those depicted in the examples of FIGS. 1-4.

At block 502, the controller 120 applies a plurality of incrementally varying voltage targets 118 to a plurality of power phase converters 106 operating in parallel between a source voltage rail 102 and a load voltage rail 104. Nominal voltage targets may be based on voltage level requirements of loads on the load voltage rail 104. A nominal and maximum current associated with the voltage level can be defined according to system design parameters and Ohm's law. The controller 120 can determine a number of power phase converters 106 that are active which may include a level redundancy, such as operating with two phase redundancy, single phase redundancy, or no redundancy. Based on prior testing and modeling, a voltage offset can be established to each phase location that under typical current and ambient conditions will unbalance the current outputs to approximately balance the phase temperatures, which can be different depending upon redundancy and number of power phase converters 106 that are operational. The controller 120 may set the incrementally varying voltage targets 118 based on an expected temperature and current distribution between the power phase converters 106 under nominal conditions as adjusted by the number of power phase converters 106 that are active.

At block 504, the controller 120 monitors a phase temperature of each of the power phase converters 106. At block 506, the controller 120 compares the phase temperature of each of the power phase converters 106 to a thermal adjustment limit. At block 508, the controller 120 adjusts one or more of the power phase converters 106 to reduce an associated output current based on determining that at least one of the power phase converters 106 exceeds the thermal adjustment limit.

Adjustments to one or more of the power phase converters 106 can include decreasing at least one of the voltage targets 118 for the at least one of the power phase converters 106 that exceeds the thermal adjustment limit. Adjustments to one or more of the power phase converters 106 can also include increasing at least one of the voltage targets 118 to compensate for the reduction of the associated output current by the at least one of the power phase converters 106 that exceeds the thermal adjustment limit. Thus, output voltages of power phase converters 106 are incrementally raised on the coolest phases and lowered on the warmest phases. A magnitude of adjustment may be determined based on a difference from a mean phase temperature of all of the power phase converters 106 and the phase temperature of each of the one or more of the power phase converters 106 being adjusted. Initial adjustments can be based on locations of the power phase converters 106 first and later based on phase temperature. It is possible to substantially raise the output current without raising the warmest temperature of any of the power phase converters 106.

As previously described, the power phase converters 106 can form a first subgroup 204 on a POL card and a second plurality of power phase converters 106 may form a second subgroup 206 on the POL card between the source voltage rail 102 and a second load voltage rail 208, where the first and second subgroups 204, 206 share a common heat sink 300. Adjustments to the power phase converters 106 can be performed at a subgroup level to substantially balance the phase temperature across each of the first and second subgroups 204, 206.

Figure 6:
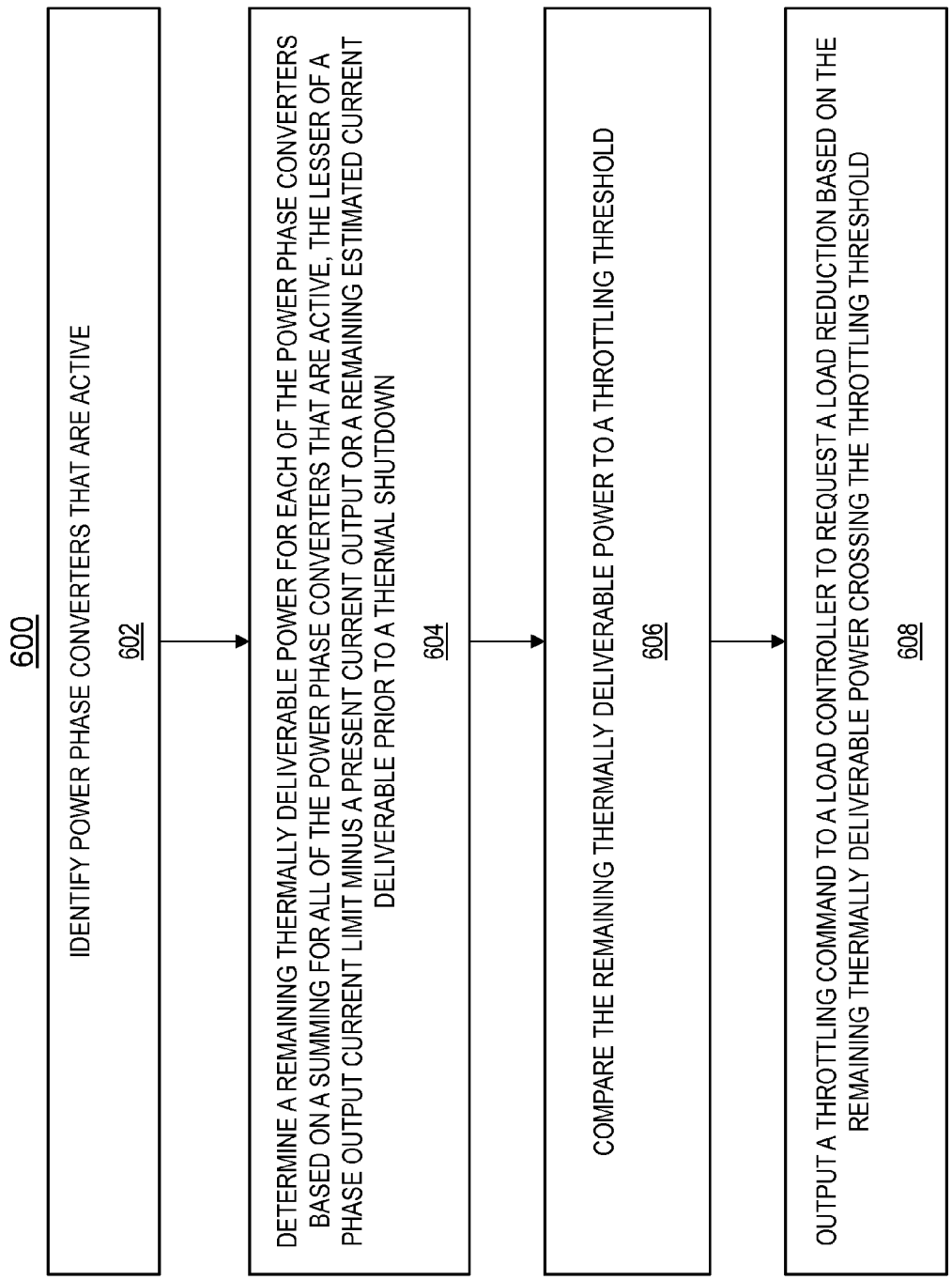
FIG. 6 illustrates a flow diagram of another aspect of a method for thermal management in a multi-phase power system in accordance with an exemplary embodiment.

FIG. 6 illustrates a flow diagram of a method 600 for thermal management in a multi-phase power system which may be an extension of the method 500 of FIG. 5 in accordance with an exemplary embodiment. The method 600 can be performed by the controller 120 of FIGS. 1 and 2 and is further described in reference to FIGS. 1-4 for purposes of explanation. However, the method 600 of FIG. 6 can be implemented on systems with alternate configurations and elements beyond those depicted in the examples of FIGS. 1-4.

At block 602, the controller 120 can identify power phase converters 106 that are active. For instance, one or more redundant instances of the power phase converters 106 can be deactivated on an error condition. At block 604, the controller 120 can determine a remaining thermally deliverable power for each of the power phase converters 106 based on a summing for all of the power phase converters 106 that are active, the lesser of a phase output current limit minus a present current output or a remaining estimated current deliverable prior to a thermal shutdown. In one example, a power phase converter 106 approaching thermal shutdown raises its temperature an additional four degrees C. per amp. Therefore, if three power phase converters 106 have eight degrees C. of margin and three others have twelve degrees C. and three others have four degrees C. of margin from thermal shutdown and two are at their current limit, the controller 120 can estimate that ideally the POL card has 3×2+3×3+3×1+2×0=18 amps of remaining thermally deliverable power.

At block 606, the controller 120 may compare the remaining thermally deliverable power to a throttling threshold. The throttling threshold is set at a value that provides margin for the system to react before reaching a thermal shutdown while also reducing the likelihood of nuisance trips. At block 608, the controller 120 can output the throttling command 210 to a load controller to request a load reduction based on the remaining thermally deliverable power crossing the throttling threshold. When the remaining thermally deliverable power crosses the throttling threshold, server processor chip cores can be throttled to reduce operating frequency and prevent a server crash. The throttling command 210 may have other load shedding effects, such as removing power from unused/idle resources. When cooling conditions re-establish that a safe level of power can be delivered, the throttling command 210 may be removed.

Figure 7:
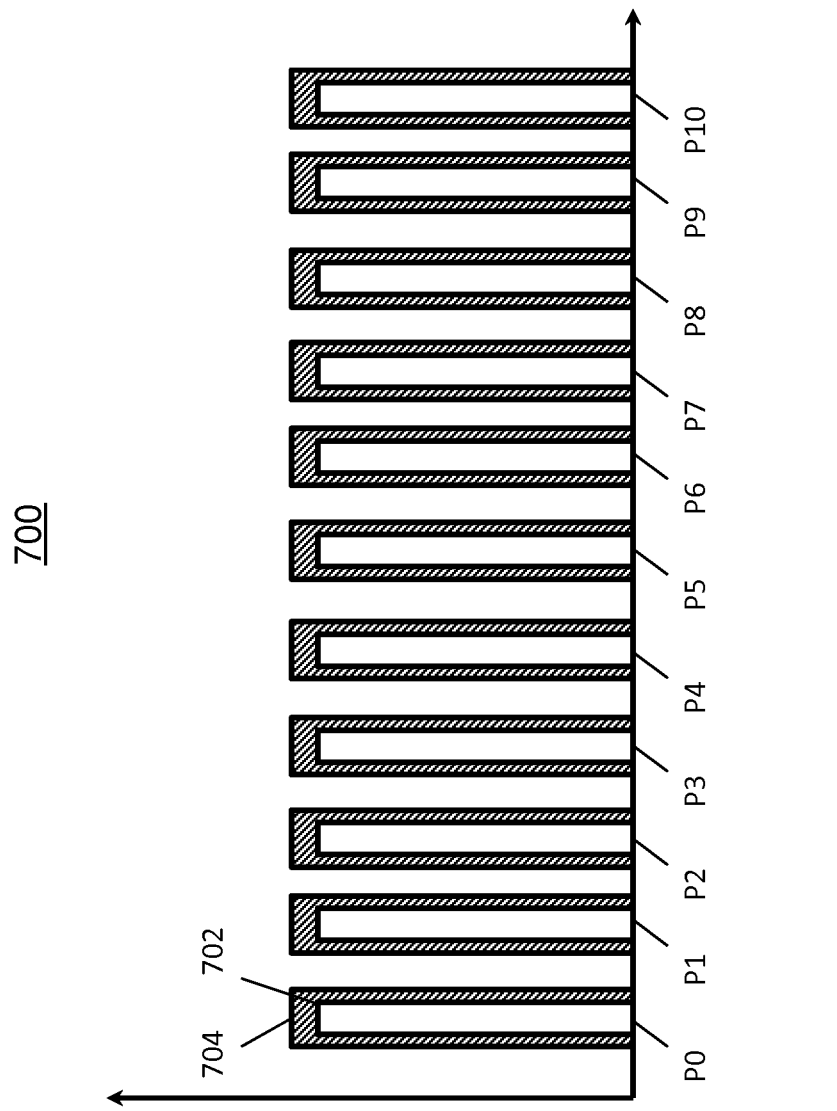
FIG. 7 illustrates a chart depicting a relationship of current and voltage relative to a number of phases prior to thermal management in accordance with an exemplary embodiment.
Figure 8:
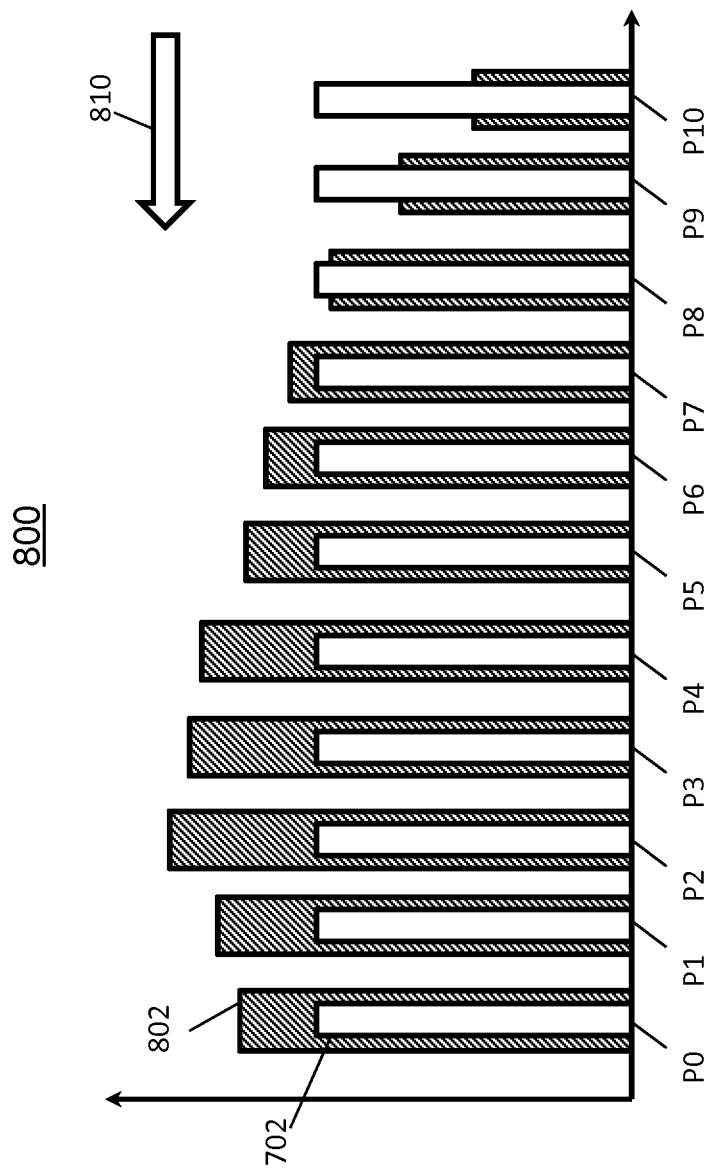
FIG. 8 illustrates a chart depicting a relationship of current and temperature relative to a number of phases prior to thermal management in accordance with an exemplary embodiment.

FIG. 7 illustrates a chart 700 depicting a relationship of current 702 and voltage 704 relative to a number of phases P0-P10 prior to thermal management in accordance with an exemplary embodiment. The phases P0-P10 may be the power phase converters 106D-106N of FIGS. 2 and 3. The example of FIG. 7 depicts a state when all of the phases P0-P10 have substantially balanced current 702 and voltage 704. Due to ineffectiveness of a cooling flow 810 of FIG. 8, the balanced current 702 and voltage 704 of FIG. 7 result in a temperature imbalance as depicted in FIG. 8 prior to applying thermal management. For example, if the thermal manger 126 of FIG. 1 is disabled, the balance in current 702 as depicted in FIGS. 7 and 8 results in varying temperature 802 per phase. In the chart 800 of FIG. 8, phases P10, P9, and P8 have relatively cooler temperatures 802. As the cooling flow 810 passes over more phases P0-P10, the cooling effectiveness is reduced, resulting in progressively higher temperatures 802 across phases P7, P6, P5, P4, P3, and P2. Phases P1 and P0 may have reduced temperatures 802 due to being located closer to an end that can enhance cooling effects. Charts 700 and 800 are illustrated for purposes of explanation, and the thermal manager 126 of FIG. 1 need not be initially disabled such that the condition of FIGS. 7 and 8 is reached.

Figure 9:
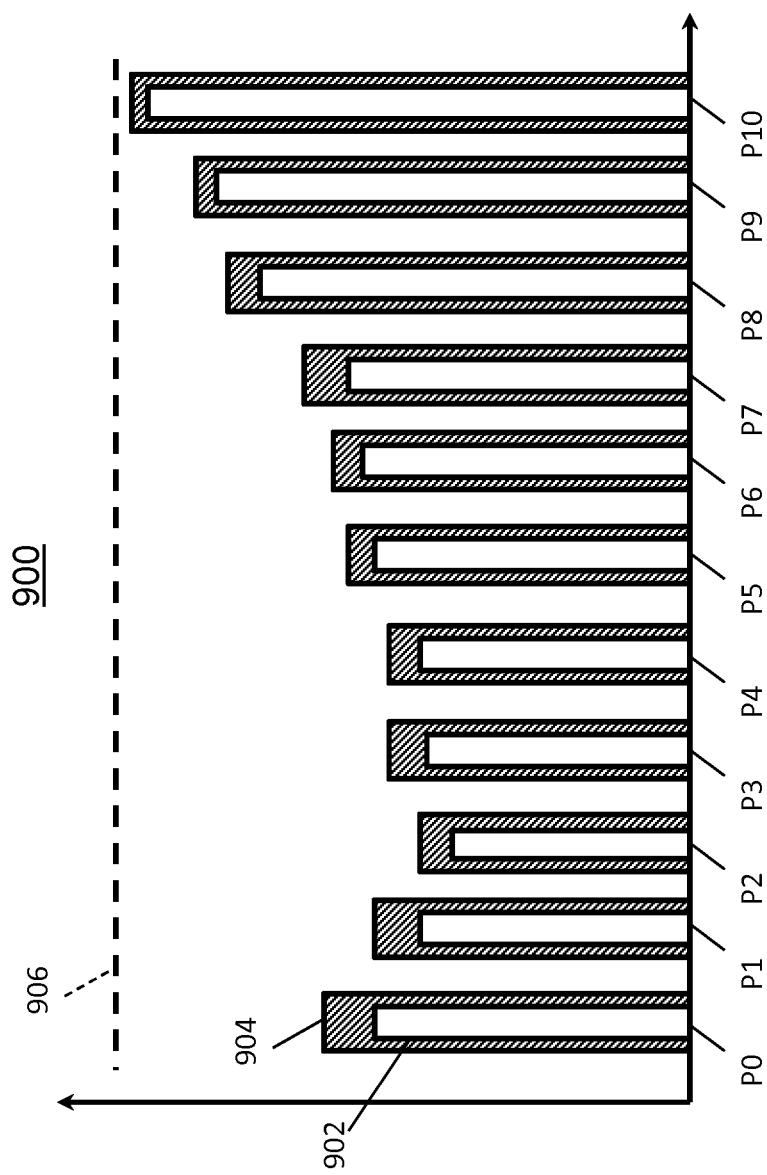
FIG. 9 illustrates a chart depicting a relationship of current and voltage relative to a number of phases after thermal management in accordance with an exemplary embodiment.
Figure 10:
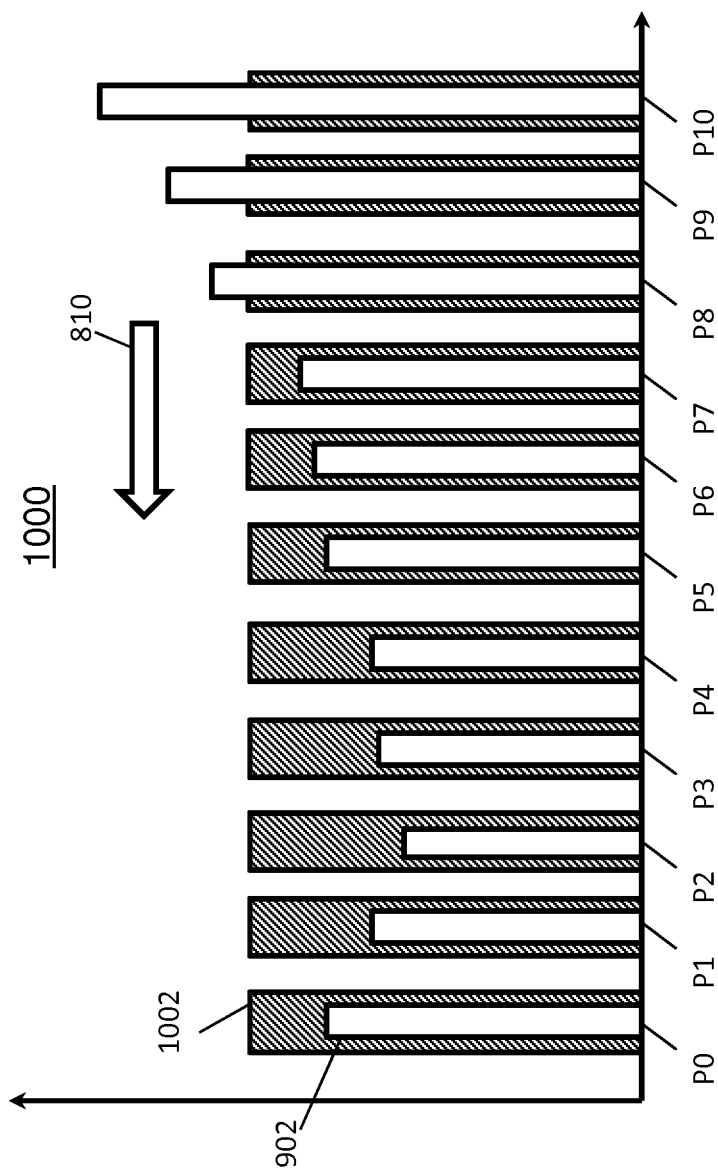
FIG. 10 illustrates a chart depicting a relationship of current and temperature relative to a number of phases after thermal management in accordance with an exemplary embodiment.

FIG. 9 illustrates a chart 900 depicting a relationship of current 902 and voltage 904 relative to phases P0-P10 after the thermal manager 126 of FIG. 1 is enabled in accordance with an exemplary embodiment. To counteract the ineffectiveness of the cooling flow 810 as illustrated in FIG. 8, the voltage 904 is incrementally varied to vary the currents 902 and thereby adjust the phase temperatures 1002 as depicted in FIGS. 9 and 10. The current 902 and voltage 904 of phases that were cooler in FIG. 8, such as phases P8-P10 can be increased, while the hotter phases of FIG. 8, such as phases P0-P7 have decreased current 902 and voltage 904. An upper current limit 906 can be used to ensure that no phases are set to a current 902 that exceeds the upper current limit 906. FIG. 10 illustrates a chart 1000 depicting a relationship of the current 902 and temperature 1002 relative to the phases P0-P10 after the thermal manager 126 of FIG. 1 is enabled in accordance with an exemplary embodiment.

As can be seen in the example of FIG. 10, the current 902 is imbalanced to reach a substantial balance of the temperatures 1002. As the effectiveness of the cooling flow 810 varies, the currents 902 can be readjusted.

Technical effects and benefits include providing thermal balancing in a multi-phase power supply of a computer system. By adjusting power phase converter voltage/current set points for a series of power phase converters, substantial thermal balancing can be achieved under a number of operating conditions. Since the hottest power phase converter is most likely to cause a thermal shutdown event, actively managing voltage targets of the power phase converters can keep the power phase converters closer to the average such that a greater amount of total power delivered can be supported. Power phase converter adjustments can be performed in a balanced manner such that a net sum voltage at each load voltage rail is substantially unchanged after the adjustments. Thus, thermal balancing may be achieved while also maintaining a substantially constant operating voltage for each load voltage rail.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:
1. A method comprising:
applying a plurality of incrementally varying voltage targets to a plurality of power phase converters operating in parallel between a source voltage rail and a load voltage rail;
monitoring a phase temperature of each of the power phase converters;
comparing the phase temperature of each of the power phase converters to a thermal adjustment limit;
adjusting one or more of the power phase converters to reduce an associated output current based on determining that at least one of the power phase converters exceeds the thermal adjustment limit;
determining a remaining thermally deliverable power for each of the power phase converters based on a summing for all of the power phase converters that are active a lesser of a phase output current limit minus a present current output or a remaining estimated current deliverable prior to a thermal shutdown;

comparing the remaining thermally deliverable power to a throttling threshold; and outputting a throttling command to a load controller to request a load reduction based on the remaining thermally deliverable power crossing the throttling threshold.

2. The method of claim 1, wherein adjusting one or more of the power phase converters comprises decreasing at least one of the voltage targets for the at least one of the power phase converters that exceeds the thermal adjustment limit.

3. The method of claim 2, wherein adjusting one or more of the power phase converters comprises increasing at least one of the voltage targets to compensate for the reduction of the associated output current by the at least one of the power phase converters exceeds the thermal adjustment limit.

4. The method of claim 3, wherein a magnitude of adjustment is determined based on a difference from a mean phase temperature of all of the power phase converters and the phase temperature of each of the one or more of the power phase converters being adjusted.

5. The method of claim 1, further comprising:

determining a number of power phase converters that are active; and setting the incrementally varying voltage targets based on an expected temperature and current distribution between the power phase converters under nominal conditions as adjusted by the number of power phase converters that are active.

6. The method of claim 1, wherein the power phase converters form a first subgroup on a point-of-load card and a second plurality of power phase converters form a second subgroup on the point-of-load card between the source voltage rail and a second load voltage rail, the first and second subgroups share a common heat sink, and adjustments to the power phase converters are performed at a subgroup level to substantially balance the phase temperature across each of the first and second subgroups.

* * * * *